United States Patent [19]

Andersen et al.

[11] Patent Number: 4,853,166

[45] Date of Patent: Aug. 1, 1989

[54] METHOD AND AN APPARATUS FOR PRODUCING COMPOUND BLOCK MEMBERS, ESPECIALLY BUILDING BLOCKS HAVING A HEAT INSULATING INTERMEDIATE LAYER

[75] Inventors: Bent S. Andersen; Jens Therkildsen, both of Videbaek, Denmark

[73] Assignee: A/S Fibo, Risskov, Denmark

[21] Appl. No.: 159,593

[22] PCT Filed: Jul. 2, 1987

[86] PCT No.: PCT/DK87/00083

§ 371 Date: Mar. 1, 1988

§ 102(e) Date: Mar. 1, 1988

[87] PCT Pub. No.: WO88/00267

PCT Pub. Date: Jan. 14, 1988

[30] Foreign Application Priority Data

Jul. 2, 1986 [DK] Denmark ............................ 3141/86

[51] Int. Cl.⁴ ............................................. B29C 31/00

[52] U.S. Cl. .................................. 264/46.5; 264/261; 249/114.1; 425/123; 425/126

[58] Field of Search .................... 264/46.4, 46.5, 46.6, 264/261; 425/123, 126 R; 249/114 R

[56] References Cited

U.S. PATENT DOCUMENTS

| | | | |
|---|---|---|---|
| 3,615,071 | 10/1971 | Harper | 249/114 |
| 3,964,847 | 6/1976 | Redmer et al. | 425/126.1 |
| 4,098,562 | 7/1978 | Levin | 425/123 |
| 4,529,562 | 7/1985 | Connett et al. | 264/46.4 |
| 4,543,052 | 9/1985 | Stevens | 425/123 |

FOREIGN PATENT DOCUMENTS 2711806 9/1978 Fed. Rep. of Germany .

*Primary Examiner*—Jan H. Silbaugh
*Assistant Examiner*—Allan R. Kuhns
*Attorney, Agent, or Firm*—Antonelli, Terry & Wands

[57] ABSTRACT

For continuous production of block members consisting of outer block elements (2) having an intermediate layer (4) of a binding material, especially lightweight concrete building blocks with a heat insulating intermediate layer of foamed polyurethane, a conveyor is used which has a chain (8) of L-shaped plate members (10) consisting of a carrier plate (14) and another plate portion (16) projecting outwards therefrom. The block elements are placed in spaced pairs on the carrier plate, and the intermediate space is filled with foam material at a dosing station (28). Because of the L-shape of the plate members (10) the block elements (2) may easily be supplied onto the chain as this passes a sprocket wheel (18), and the block elements may be fed to the conveyor during continuous movement of the chain.

10 Claims, 2 Drawing Sheets

Figures 1, 2:
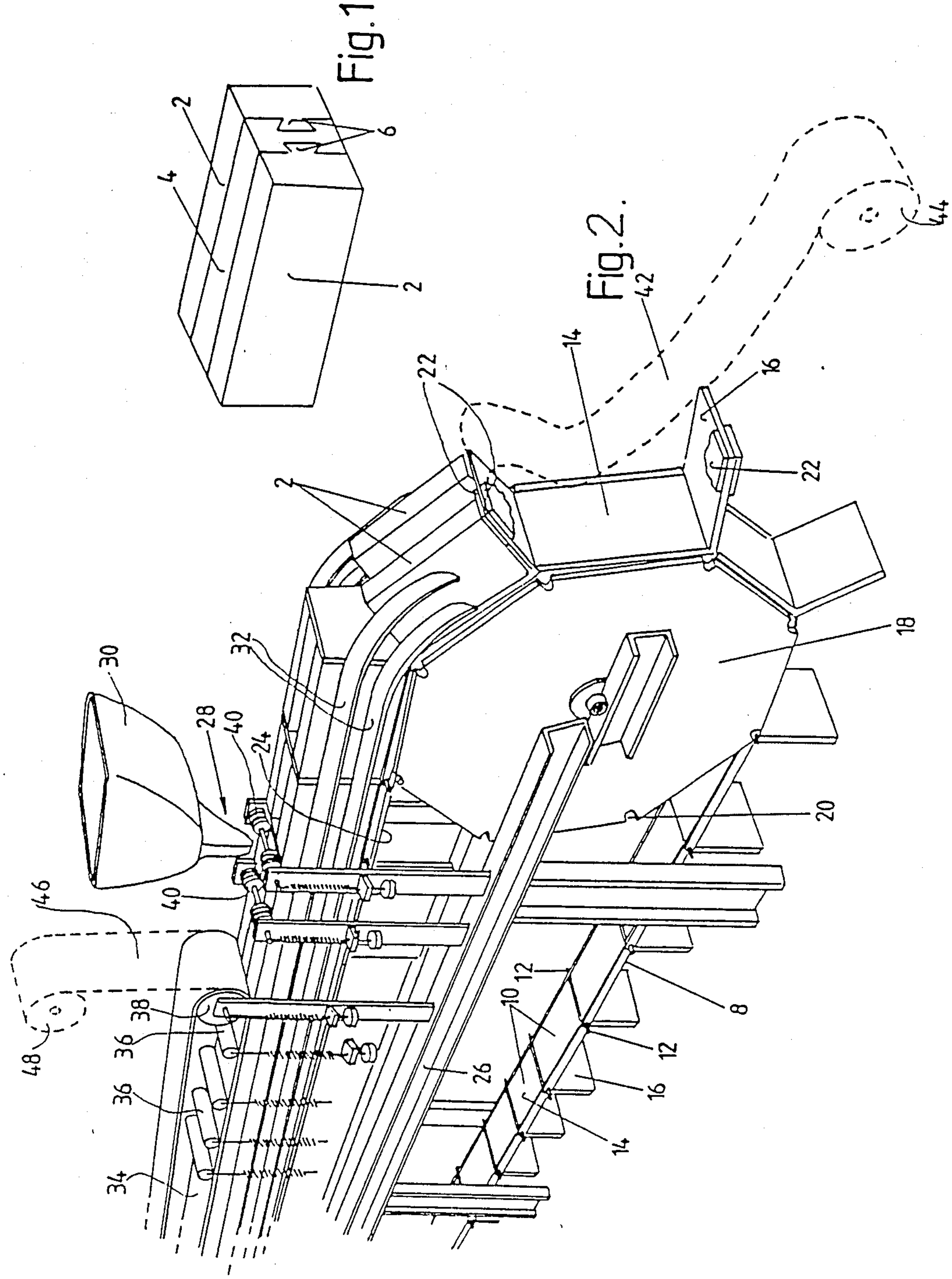

2
4
6
2

2
22
14
42
44
16
22
18
32
30
28
40
24
20
46
40
12
8
38
36
12
10
36
26
16
14
34
48

METHOD AND AN APPARATUS FOR PRODUCING COMPOUND BLOCK MEMBERS, ESPECIALLY BUILDING BLOCKS HAVING A HEAT INSULATING INTERMEDIATE LAYER

The present invention relates to a method for successive production of block members, especially lightweight concrete blocks, by assembling at least two mutually separated block elements by means of an intermediate filling of binding material, preferably of heat insulating foam material, which method is of the type wherein the block elements are placed opposite each other on a carrier plate which is included in a segmented conveyor comprising a preferably endless row of such carrier plates which are forwarded past a filling station at which the said filler material is placed between the block elements by molding out the space between the blocks or by supplying a foaming and hardening material thereto, the carrier plates being forwarded together with outwardly projecting end mould plates which engage the opposite ends of the block elements and by the passage of a bent or arched reception section of the conveyor are mutually diverging such that in this section it is easy to place the block elements on the carrier plates, while the end mould plates by further movement along a straight or less arched portion of the conveyor path assume their said block end engaging positions.

Such block members are very advantageous for use in the construction industry, as they are usable for building double-brick walls with an interior layer of a stable insulation material. The use of lightweight concrete elements with an interposed foam material, e.g. stiff polyurethane foam, may condition the block elements to be relatively large, whereby it is possible to build up a double-brick wall rapidly, which as an integral part will comprise the necessary wall cavity insulation which may even have a strengthening effect. The foam material may remain stable, i.e. without collapsing in the wall.

Hitherto such lightweight concrete building blocks have been produced in moulding boxes, in which the block elements are placed at the opposite ends of the box, and a foaming foam material is supplied to the space between the elements. The moulding box is made to fit tightly about this moulding space, such that the foam material is kept inside the concerned space, i.e. as far as possible without flowing onto the exterior surfaces of the elements, which, however, has proven difficult to avoid. This practically purely manual production method is difficult and costly, but the products are so advantageous that it has been realistic to use it.

From EP-No. A1-171,818 is known a method and a system for producing concrete block members of a similar type, in connection with which it is suggested to effect the production continuously in the manner generally referred to above. More specifically, carrier plates are used which form the said conveyor, and which are mutually separated by short carrier plates having another plate member projecting outwards therefrom at their middle. In the straight path portion of the conveyor the long and short carrier plates are placed in immediate extension of each other, and the block elements are received in the spaces between the successive outwardly projecting plate members, which may thus function as end mould plates. The conveyor consisting of the carrier plates is forwarded through a rather acutely bent path at a supply station for the block elements, whereby the rearmost long carrier plate in the straight portion of the conveyor is able to receive the block elements by a horizontal insertion of these from behind, the following short carrier plate being tilted so far downwards that its associated end mould plate is placed in a rearwardly and possibly slightly upwardly projecting position, in which its top portion is situated below the level of the long carrier plate such that the said mould plate will not obstruct the insertion of the block elements. This arrangement requires that the system operate in an intermittet manner, as it would not otherwise be possible at a reasonable operating speed to insert the block elements before the rearmost mould plate is swung upwards above the level at which the elements are supplied.

The known system also presents certain other problems, but especially the need for intermittent operation is disadvantageous, as the conveyor has to carry a long row of concrete elements such that a very forceful actuation is required for constantly starting and stopping such a conveyor.

It is the purpose of the invention to provide a method of the said type, by which the production of the block members may take place in a smoothly progressing manner, and it is also an aim in connection with the invention to obtain further advantages.

According to the invention the carrier plates are brought forwards in fixed connection with an outwardly projecting end mould plate at one end in such a manner that the associated end mould plate at the opposite end is constituted by the corresponding mould plate on the next carrier plate, the block elements in the reception section being placed on the successively passing carrier plates while these are situated in the said bent or arched portion of the conveyor path. In connection with the invention it is thus renounced to feed the block elements to the carrier plates in the manner described above, as the elements are supplied onto the carrier plates before these have reached the straight conveyor run, this supplying onto more or less inclined carrier plates being made possible by the elements at the lower end of the carrier plates being supported by the end mould plate, while the supply may otherwise take place unobstructedly because the outwardly projecting mould plates at the opposite ends of the carrier plate will be diverging. In operation it is an essential advantage that the elements may be placed on carrier plates which are continuous along the entire length of the elements, as deformation problems adjacent the joints between the said short and long carrier plate portions underneath the elements will be avoided. The feeding may take place quickly and reliably, also while the carrier plates change their angular position while passing the arched conveyor portion, and thus there is no need for temporary stopping of the conveyor, i.e. this may well operate at a constant speed.

The invention furthermore comprises an associated apparatus for implementing the method. The apparatus comprises a conveyor having an endless row of carrier plates and intermediate, outwardly projecting end mould plates, which by the passing of the carrier plates through a reversing section assume pair-wise diverging positions, and also comprising longitudinal side support means for side supporting the block elements, which at the said reversing section are placed on the carrier plates, longitudinal top support means held down against the top side of the row of elements, and a filler station located between the reversing section and the beginning of the longitudinal top support means for supplying filler material into one or more of such spaces which occur between block elements which have been placed with a mutual distance on the single carrier plates, characterized in that each carrier plate is provided in a fixed manner with an outwardly projecting end mould plate at one end, and at the other end having a corresponding, outwardly-projecting transverse plate member which is constituted by the fixed end mould plate on the next carrier plate, and whereby the carrier plates in the reversing section are in a supporting engagement with guiding means such as a sprocket wheel.

Figure 3:
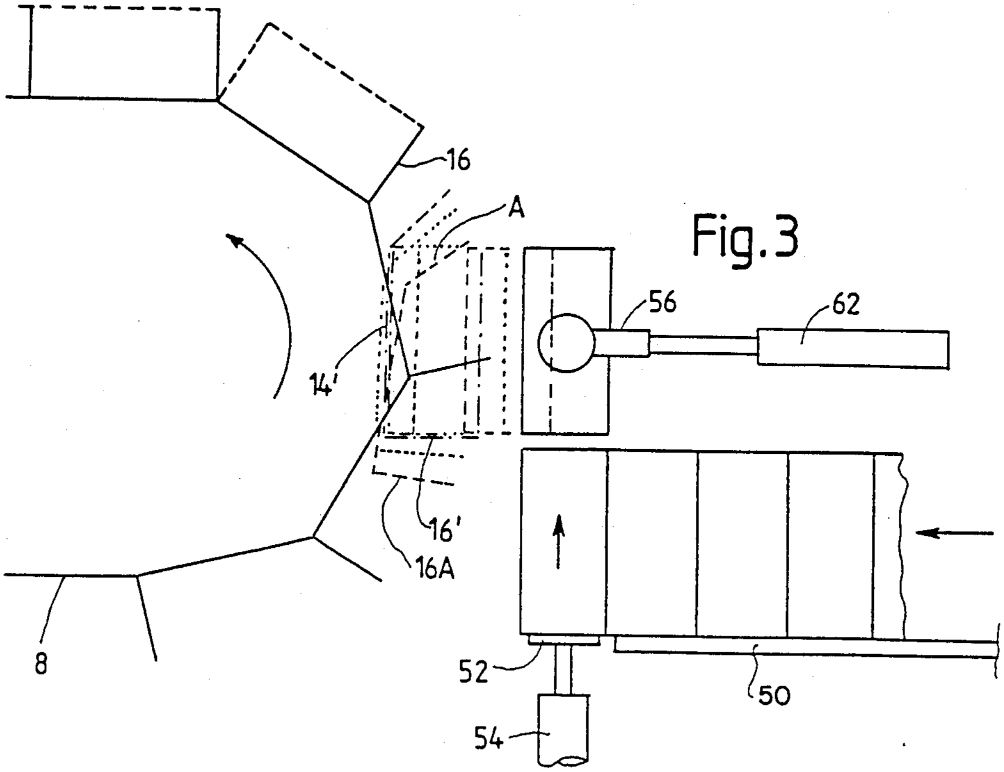
Figure 4:
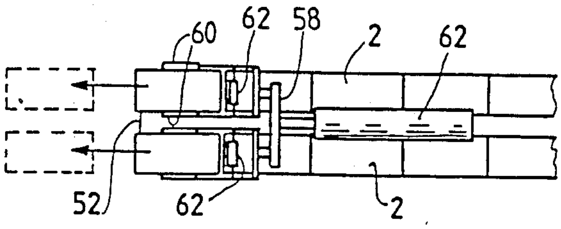

In the following, the invention is described in more detail with reference to the drawing in which FIG. 1 is a perspective view of a block member of a known type, FIG. 2 is a perspective view of an end portion of an apparatus according to the invention, and FIGS. 3 and 4 are schematic views illustrating the supply of block elements to the conveyor.

The block elements shown in FIG. 1 consist of two outer lightweight concrete elements 2 having an intermediate layer of stiff polyurethane foam 4, which is provided by foaming in the concerned space, with the elements 2 being placed in a surrounding moulding box. For obtaining a good coherence in the block member it may be appropriate to provide for a dovetail engagement between the portions 2 and 4, as indicated by 6. Block members of this type may be used for integrated construction of a double-brick wall having a wall cavity insulation 4.

For producing such block members there may be used an apparatus as illustrated in FIG. 2. The apparatus consists principally of a conveyor chain 8, formed by a row of L-shaped plate members 10 which are hinged by pivots 12 and each consists of a longitudinal carrier plate portion 14 and a plate member 16 projecting perpendicularly outwards from one end thereof, this chain passing about large sprocket wheels 18 at opposite ends of the apparatus, the sprocket wheels being driven by driving means not shown. In principle the sprocket wheels 18 are shaped as polygons having recesses 20 for receiving the pivots 12, such that the chain 8 is guided in a well-defined manner through a path portion in which the carrier plates 14 are supported by the wheel 18 with mutually different directions, while the outwardly projecting plate members 16 will correspondingly project in mutually diverging directions.

The plate members 16 are on both sides provided with a coating 22 of rubber or a corresponding material, and preferably also the outer surface of the plate members 14 is coated with such a material.

The upper run of the conveyor chain 8 is supported on longitudinally extending guides 24, which in an appropriate, optionally height adjustable manner are supported on a chassis 26. This run is intended to convey a row of block elements 2 as shown in FIG. 1, these elements being supplied onto the conveyor as the chain passes the sprocket wheel 18 as described in more detail below. The block elements are placed with mutual spacing on each plate member 14, and they are forwarded placed between the respective outwardly projecting plate members 16 past a filling station 28, at which a foaming material is filled into the spaces between the elements 2, e.g. from a container 30. During the further operation the material foams up so as to fill out the space and bind the elements together, whereafter the foam material hardens before the block members have reached the opposite end of the apparatus, where they may be removed when the chain passes a sprocket wheel corresponding to what is indicated in FIG. 2.

During its foaming the expanding foam material may tend to force the elements 2 outwards from each other, but by means of longitudinal side guiding rails 32 it is esured that the elements 2 may not be pressed any further apart from each other than what corresponds to the desired dimensions of the finished blocks 6. Similarly the material may tend to expand upwards, but this is counteracted by means of a top belt 34 which is placed along the top side of the row of block members and is held thereagainst by means of spring biased pressing rollers 36. The belt 34 which is guided about end rollers 38 may, just as the side tracks 32, terminate somewhat before the delivery end of the apparatus, as the foam material expansion will then have stopped.

Already by the supplying of the foam material at the station 28, the elements 2 should be kept well pressed down against the plate members 14 and their rubber coatings so that the foam material does not flow underneath the elements 2, and here it is appropriate to use a pair of pressure rollers 40 for this holding down. These pressure rollers may be spring-loaded and should be present both before and after the supply station for the material.

The foam material may adhere rather strongly to the portions 14,16,34 which functio as moulding surfaces, but such adherence may be counteracted by applying a slipping agent. However, this is a laborious and in other manners inappropriate solution, and it is preferred that the problem be solved by means of a slipping sheet 42 which from a supply roller 44 is laid in beneath the elements 2, whereby the sheet material will be laid against the carrier plates 14 as well as against both sides of the plate members 16. Adjacent the belt 34 a corresponding continuous laying in of a slipping sheet material 46 may be effected from a roller 48.

The side rails 32 may in one or both sides be arranged so as to be adjustable in the transverse direction and optionally also in the height direction, and the upper pressure means 36 may be adjustable in the height direction as well, whereby it will be possible to switch between productions of members of different heights and widths. However, the length of the members will normally not be variable, as it is difficult to make use of insertion members in the moulding spaces between the plate members 16; these plate members should press against the respective block member ends, and the rubber coatings 22 may compensate for usual tolerance divergencies, but not for greater length changes.

It will be seen already from FIG. 2 that the elements 2 are easy to place on the plate members 14 at the shown rear end of the conveyor, as the plate members 14 on the sprocket wheel 18 are conveyed mutually angularly offset such that the plate members 16 project outwards in a diverging manner and thereby provide for good space for the supplying or insertion of the elements 2. The conveying may be effected at a speed of e.g. 3–10 meters per minute, i.e. there will be a reasonably ample time for supplying the elements even though the conveyor operates at constant speed. The supplying may be effected from the moment a mould plate 16 passes its horizontal position as it travels upwards, and it has to be ended before the associated carrier plate 14 reaches the horizontal conveyor run. In principle the supplying of the elements may be effected manually, but of course also automatically in a number of different manners.

In FIGS. 3 and 4 is illustrated a practical supply method, FIG. 3 being a schematic side view of the sprocket wheel 18 and of a supply arrangement for the elements, while FIG. 4 shows the supply arrangement seen from above.

The arrangement shown comprises a supply chute 50 along which two rows of elements 2 are pushed forwards standing on their respective end surfaces. Outside the end of the chute 50 a lifting platform 52 is placed which will receive the foremost pair of elements 2 and by means of a cylinder 54 lift the elements up to the illustrated raised position, in which they are gripped by a gripper head 56 serving to move the elements forwardly for depositing them on the conveyor as described below. Thereafter a new pair of elements may be fetched and placed while the conveyor chain is forwarded at constant speed.

The operation of the gripping head 56 is closely synchronized with the conveying of the plate members 10, as it is possible hereby to place the block elements on the conveyor by a pure insertion movement. The gripping head consists of a base member 58 which carries forwardly projecting gripper tongs 60, which, when the base member 58 is pushed forwardly by means of a cylinder 62, are introduceable along the lateral surfaces of the block elements as located on the raised platform 52, whereafter they are actuated by means of control cylinder 62 to clamp the block elements and to carry the elements forwards towards the wheel 18 by the further advancing of the gripping head 56 while the platform 52 is lowered.

The locations of the various parts are adapted such that the insertion of the elements is effected in a level that corresponds to the position of the carrier plates 14 in that situation where they, as the wheel 18 turns, assume a vertical position, which is marked by 14', 16' in FIG. 3. Hereby advantage is taken of the fact that the preceding outwardly projecting plate member 16 is upwardly inclined at an angle of between 30° and 60°, preferably about 45°, relative to the trailing projecting plate member, whereby the insertion of the elements may be started as soon an the outer end of this plate member has been moved up above the top surface level of the elements 2, i.e. when the plate member is moved through the indicated position A. It is important that this angle be sufficiently large for the unhindered insertion of the bricks. It will be seen that the outwardly projecting plate member 16A on the following carrier plate is hereby located at or moved through a position which is somewhat below the bottom surface level of the elements. Thus there will be ample time to complete the insertion while the plate member 16A is moving up to this level, as the gripping must be released no later than at this moment. In FIG. 3 is shown, by different line types, some positions of the insertion sequence, including the final position.

We claim:

1. A method for successive production of block members by assembling at least two separated block elements by means of an intermediate filling of a binding material comprising the steps of (a) providing a segmented conveyor having a row of carrier plates, each having an outwardly projecting end mould plate fixedly connected at one end thereof such that an associated end mould plate at the opposite end of the carrier plate is constituted by the corresponding end mould plate on the next carrier plate;

(b) forwarding the carrier plates together with the outwardly projecting end mould plates through a bent or arched reception section of the conveyor path such that the end mould plates are mutually diverging;

(c) placing the separated block elements on the successively passing carrier plates while said plates are situated in said bent or arched section of the conveyor path during continuous movement of the conveyor, wherein the outwardly projecting end mould plates engage opposite ends of the block elements, said end mould plates being mutually diverging in said arched section such that it is easy to place the block elements on the carrier plates; and (d) forwarding the row of carrier plates containing the separated block elements past a filling station at which the binding material is placed between the block elements to form the block member.

2. A method according to claim 1, wherein the block elements are inserted by a straight insertion movement in the space between two successive end mould plates.

3. A method according to claim 1, wherein the binding material is a heat insulating foam material.

4. A method according to claim 1, wherein the block members are lightweight concrete building blocks.

5. An apparatus for successive production of block members, comprising a conveyor having an endless row of carrier plates and intermediate, outwardly projecting end mould plates, which by the passing of the carrier plates through a reversing section assume pair-wise diverging positions such that a preceding outwardly projecting end mould plate member is upwardly inclined at an angle relative to a trailing projecting end mould plate member, and also comprising longitudinal side support means for side supporting the block elements, which at the said reversing section are placed on the carrier plates, longitudinal top support means held down against the top side of the row of elements, and a filler station located between the reversing section and the beginning of the longitudinal top support means for supplying filler material into one or more of such spaces which occur between block elements which have been placed with a mutual distance on the single carrier plates, wherein each carrier plate is provided in a fixed manner with an outwardly projectig end mould plate at one end, and at the other end having a corresponding, outwardly projecting transverse plate member which is constituted by the fixed end mould plate on the next carrier plate, and whereby the carrier plates in the reversing section are in a supporting engagement with guiding means.

6. An apparatus according to claim 5, wherein the end mould plates and the carrier plates are provided with a coating of rubber or a correspondingly yielding material.

7. An apparatus according to claim 5, wherein the guiding means is arranged to guide the carrier plates through a path in the reversing section with a mutual angle between adjacent end mould plates of the magnitude 30°-60°.

8. An apparatus according to claim 5, further comprising a station for successive insertion of block elements by insertion of these in a position in which they are primarily supported by the respective end mould plates.

9. An apparatus according to claim 5, wherein the guiding means is a sprocket wheel.

10. An apparatus according to claim 7, wherein the angle between adjacent end mould plates is approximately 45°.

* * * * *